United States Patent
Christensen et al.

(10) Patent No.: US 9,081,893 B2
(45) Date of Patent: Jul. 14, 2015

(54) DYNAMIC LAZY TYPE SYSTEM

(75) Inventors: Erik Christensen, Shoreline, WA (US);
Michael Coulson, Clyde Hill, WA (US);
Clemens Szyperski, Redmond, WA (US); Gregory Hughes, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 553 days.

(21) Appl. No.: 13/163,261

(22) Filed: Jun. 17, 2011

(65) Prior Publication Data
US 2012/0216077 A1 Aug. 23, 2012

Related U.S. Application Data

(60) Provisional application No. 61/444,178, filed on Feb. 18, 2011.

(51) Int. Cl.
| G06F 11/00 | (2006.01) |
| G06F 11/36 | (2006.01) |
| G06F 9/45 | (2006.01) |
| G06F 9/445 | (2006.01) |

(52) U.S. Cl.
CPC ............ *G06F 11/3612* (2013.01); *G06F 8/437* (2013.01); *G06F 9/44589* (2013.01)

(58) Field of Classification Search
CPC ....... G06F 8/31; G06F 8/437; G06F 11/3612; G06F 9/4428

USPC .......... 714/38.1; 717/141, 143, 114; 719/330, 719/331; 707/802
See application file for complete search history.

(56) References Cited

U.S. PATENT DOCUMENTS

| 5,371,891 | A | * | 12/1994 | Gray et al. ..................... 717/140 |
| 5,410,705 | A | * | 4/1995 | Jones et al. ..................... 717/168 |
| 6,145,120 | A | * | 11/2000 | Highland ...................... 717/106 |
| 6,618,769 | B1 | * | 9/2003 | Bracha et al. ................. 719/332 |
| 6,763,397 | B1 | * | 7/2004 | Bracha et al. ................. 719/332 |
| 7,062,500 | B1 | * | 6/2006 | Hall et al. ............................. 1/1 |
| 7,076,785 | B2 | | 7/2006 | Mishra et al. |
| 7,389,498 | B2 | | 6/2008 | Meijer et al. |
| 8,126,931 | B2 | * | 2/2012 | Conradi ......................... 707/802 |
| 2004/0045019 | A1 | * | 3/2004 | Bracha et al. ................. 719/332 |
| 2004/0216094 | A1 | * | 10/2004 | Bosworth et al. ............. 717/141 |
| 2005/0055680 | A1 | | 3/2005 | Kluger et al. |
| 2005/0060695 | A1 | | 3/2005 | Hostetter et al. |
| 2006/0129974 | A1 | * | 6/2006 | Brendle et al. ................ 717/108 |
| 2007/0055978 | A1 | | 3/2007 | Meijer et al. |
| 2007/0162844 | A1 | * | 7/2007 | Woodall et al. ............... 715/517 |

(Continued)

OTHER PUBLICATIONS

Meijer, "Static Typing Where Possible, Dynamic Typing When Needed: The End of the Cold War Between Programming Languages" Aug. 2004, Microsoft Corporation, p. 1-6.*

(Continued)

*Primary Examiner* — Bryce Bonzo
*Assistant Examiner* — Jeison C Arcos
(74) *Attorney, Agent, or Firm* — Brian Haslam; Mike Allen; Micky Minhas

(57) ABSTRACT

A dynamic, lazy type system is provided for a dynamic, lazy programming language. Consequently, programs can benefit from runtime flexibility and lightweight notation in combination with benefits afforded by a substantial type system.

20 Claims, 6 Drawing Sheets

(56) References Cited

U.S. PATENT DOCUMENTS

| | | | | |
|---|---|---|---|---|
| 2007/0283325 | A1* | 12/2007 | Kumar et al. | 717/122 |
| 2008/0162536 | A1* | 7/2008 | Becker et al. | 707/102 |
| 2010/0235810 | A1 | 9/2010 | Campbell et al. | |
| 2012/0072890 | A1* | 3/2012 | Bosworth et al. | 717/141 |

OTHER PUBLICATIONS

Cheney, "A Lightweight Implementation of Generics and Dynamics" Oct. 2002, ACM, p. 90-104.*

Appel "A Runtime System" May 1989, Princeton University, p. 1-34.*

"International Search Report", Mailed Date: Sep. 20, 2012, Application No. PCT/US2012/025790, Filed Date: Feb. 20, 2012, pp. 8.

Laufer, et al., "The Promises of Typed, Pure, and Lazy Functional Programming: Part II", Retrieved at <<http://ieeexplore.ieee.org/stamp/stamp.jsp?tp=&arnumber=5228719>>, vol. 11 No. 5Sep.-Oct. 2009, pp. 68-75.

Cerri, Stefano A., "Dynamic Typing and Lazy Evaluation as Necessary Requirements for Web Languages", Retrieved at <<http://citeseerx.ist.psu.edu/viewdoc/download?doi=10.1.1.28.6740&rep=rep1&type=pdf>>, European Lisp User Group Meeting, Jun. 6-8, 1999, pp. 1-17.

Segal, Loren, "Too Lazy to "Type"", Retrieved at <<http://gnuu.org/2010/12/13/too-lazy-to-type/>>, Dec. 13, 2010, pp. 4.

Vervoort, et al., "Lazy Dynamic Input / Output in the lazy functional language Clean", Retrieved at <<http://www.st.cs.ru.nl/papers/2002/verm2002-LazyDynamicIO.pdf>>, The 14th International Workshop on the Implementation of Functional Languages, Sep. 2, 2002, pp. 5.

Foster, et al., "FlowSensitive Type Qualifiers", Retrieved at <<http://www.cs.umd.edu/~jfoster/papers/pldi02.pdf>>, Proceedings of the ACM SIGPLAN 2002 Conference on Programming language design and implementation, vol. 37 No. 5, Jun. 17-19, 2002, pp. 12.

Ochoa, et al., "Dynamic Slicing of Lazy Functional Programs Based on Redex Trails", Retrieved at <<http://users.dsic.upv.es/~gvidal/german/hosc08/paper.pdf>>, Sep. 13, 2007, pp. 1-56.

Blakeley, et al., "Distributed/Heterogeneous Query Processing in Microsoft SQL Server", Retrieved at <<http://ieeexplore.ieee.org/stamp/stamp.jsp?tp=&arnumber=1410211>>, 21st International Conference on Data Engineering, ICDE, Apr. 5-8, 2005, pp. 12.

Gonzalez, et al., "Google Fusion Tables: Web-Centered Data Management and Collaboration", Retrieved at <<http://www.cs.washington.edu/homes/alon/files/sigmod10.pdf>>, Proceedings of the ACM SIGMOD conference, 2010, pp. 6.

"JackBe Corporation", Retrieved at <<http://www.jackbe.com/>>, Retrieved Date: Jun. 6, 2011, pp. 2.

Haas, et al., "Transforming Heterogeneous Data with Database Middleware: Beyond Integration", Retrieved at <<http://citeseerx.ist.psu.edu/viewdoc/download?doi=10.1.1.34.782&rep=rep1&type=pdf, IEEE Data Engineering Bulletin, 1999, pp. 1-6.

"IBM Mashup Center", Retrieved at <<http://www-01.ibm.com/software/info/mashup-center/>>, Retrieved Date: Jun. 6, 2011, pp. 2.

"SQL Server Integration Services", Retrieved at <<http://msdn.microsoft.com/en-us/sqlserver/cc511477>>, Retrieved Date: Jun. 6, 2011, pp. 2.

Pierce, et al., "Local Type Inference", Retrieved at <<http://citeseerx.ist.psu.edu/viewdoc/download?doi=10.1.1.39.8046&rep=rep1&type=pdf>>, Nov. 12, 1997, pp. 1-25.

Raman, et al., "Potter's Wheel: An Interactive Data Cleaning System", Retrieved at <<http://citeseer.ist.psu.edu/viewdoc/download;jsessionid=C94044F0C32FC9A8EED3E7532F92853F?doi=10.1.1.21.7984&rep=rep1&type=pdf>>, 27th International Conference on Very Large Data Bases, Sep. 11-14, 2001, pp. 10.

\* cited by examiner

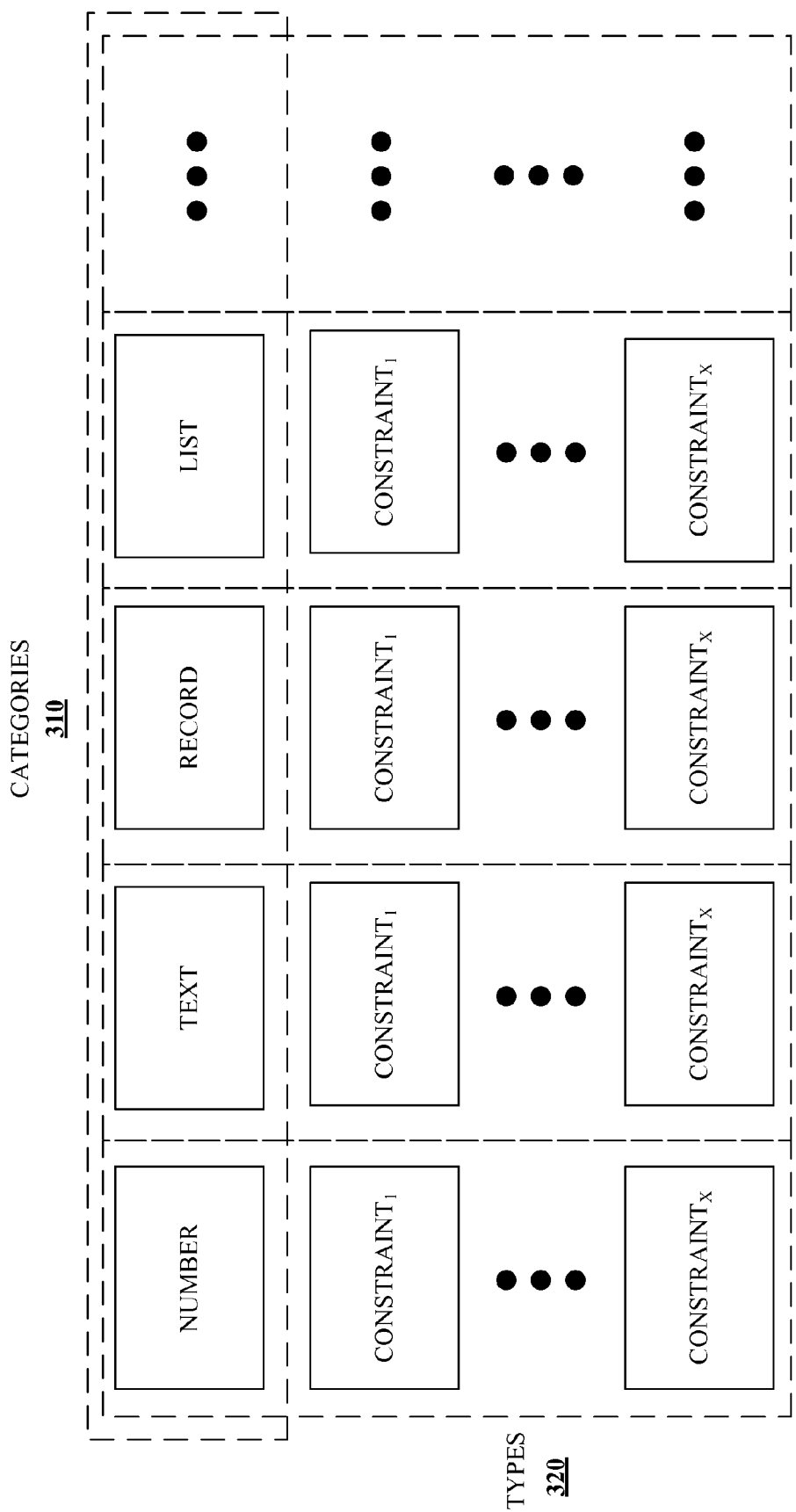

DYNAMIC LAZY TYPE SYSTEM

CROSS-REFERENCE TO RELATED APPLICATIONS

This application claims the benefit of U.S. Provisional Patent Application No. 61/444,178, filed Feb. 18, 2011, and entitled DYNAMIC LAZY TYPE SYSTEM, the entirety of which is incorporated herein by reference.

BACKGROUND

A type system defines program behavior by how expressions, values and the like are classified into types and the interaction between types. Types, or more specifically, data types, specify constraints on data utilization. A type system can be utilized to perform many useful tasks including type checking, among other things, to identify programmatic errors as a function of types associated with data. Thus, a degree of program safety can be obtained by detecting meaningless or likely invalid code.

Type systems vary across programming languages. For instance, programming languages can be statically or dynamically typed. A statically typed language (e.g., C, Java, Haskell . . . ) enables a program to be type checked at compile time prior to execution. Accordingly, all types are known at compile time, for example by explicit specification or type inference. Dynamically typed languages (e.g., JavaScript, Smalltalk . . . ) differ in that they are type checked at runtime. Consequently, types need not be explicitly specified prior to use, rather they are determined during execution.

There are various tradeoffs with respect to static and dynamic typing. In particular, static typing is beneficial in that errors can be detected prior to execution and programs can execute very efficiently. Further, design time experience can be improved since assistance such as automatic fills and suggestions can be provided based on types. However, dynamically typed languages allow more programmatic flexibility than static typed languages while still providing a degree of type safety by way of runtime checking. Furthermore, dynamically typed languages are easier to use, as programmers need not be concerned with type specification.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to a dynamic, lazy type system. More specifically, types can be identified for values lazily during execution. Subsequently, type checking can be performed to locate and return any type errors. In other words, a type system is provided for a computer-executable program specified in a dynamic, lazy programming language. Consequently, programs can be specified with runtime flexibility and lightweight notation in combination with benefits afforded by a type system.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIG. 3 is a block diagram illustrating types as constraints over a set of categories.

DETAILED DESCRIPTION

Details below are generally directed to a dynamic, lazy type system. The type system provides type support for computer-executable programs specified in a dynamic, lazy programming language. Consequently, a program can benefit from runtime flexibility and lightweight notation in combination with benefits afforded by a substantial type system.

Previous innovations concerned either dynamic programming languages or lazy programming languages but not both. For example, attempts have been made to equip dynamic languages like Smalltalk with a type system (e.g., "Strong-Talk"). However, Smalltalk is not lazy and the StrongTalk type system is substantially different from capabilities of the subject type system provided herein. Further, attempts have been made to equip lazy languages with strong static type systems. A prime example is the Haskell programming language. Nevertheless, Haskell is not a dynamic language.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
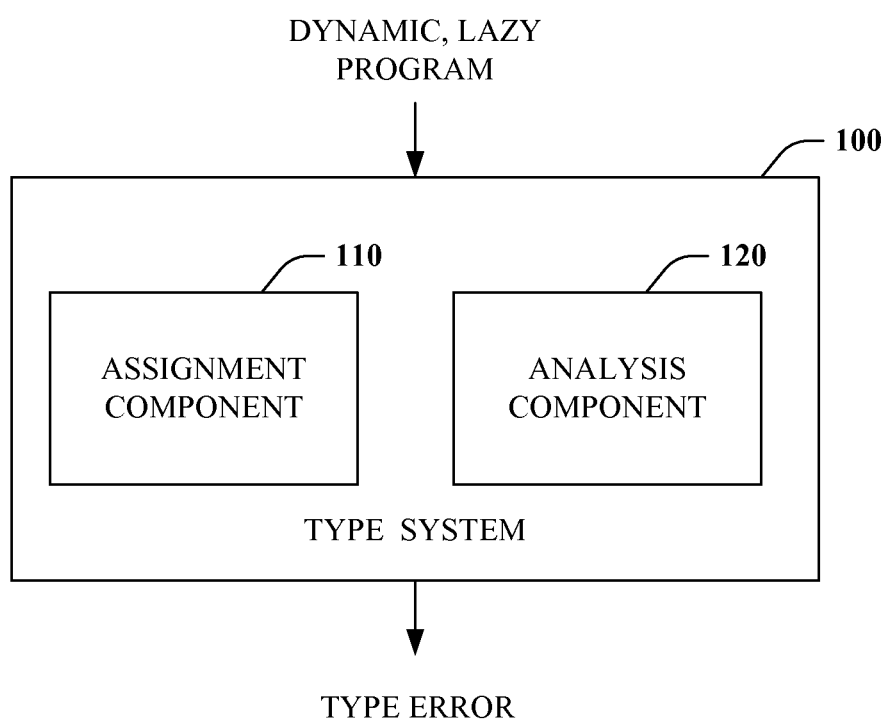
FIG. 1 is a block diagram of a type system.

Referring initially to FIG. 1, a type system 100 for a dynamic, lazy programming language is illustrated. The type system 100 provides mechanisms to assign types to values and identify errors in a computer program (e.g., meaningless code) as a function of the types, thereby providing a degree of program safety. Additionally and as discussed further below, assignment of types can facilitate federated execution (e.g., distributed execution across disparate execution engines/environments) in accordance with one embodiment. Moreover, the type system 100 can operate dynamically as well as lazily over computer-executable programs specified in a dynamic, lazy programming language. Consequently, the type system 100 can be referred to as a dynamic, lazy type system.

As shown, the type system 100 receives, retrieves, or otherwise obtains, acquires, or interacts with a dynamic, lazy program and identifies any type errors therein as a function of types. A dynamic, lazy program, specified with a dynamic, lazy computer programming language, is dynamically typed and lazily executed. Accordingly, types can be determined and assigned at runtime, rather than compile time, and portions of code can be analyzed to detect type errors just prior to execution of the portion of code instead of sometime prior.

The type system 100 includes an assignment component 110 and an analysis component 120. The assignment component 110 assigns types to computed values, wherein the types define allowable values. In one instance, a programmer can explicitly assign a type to a value. Alternatively, the type may not be specified such that the assignment component 110 can first identify a type for a value, for example utilizing automatic deduction, and assign the value the identified type. Type identification can be iterative in nature such that types assigned to a first value can be utilized to facilitate identification of a type for a second value, for example. In other words, types can flow. The analysis component 120 is configured to analyze a value and corresponding type to determine if one or more constraints provided by the type hold, or, in other words, perform type checking. If one or more constraints are not satisfied, a type error can be produced. In accordance with one aspect, the type system 100 can perform dynamic checking, or, stated differently, perform type checking during program execution. Furthermore, type checking can be performed lazily, or as needed, over lazily executed expressions, for example.

In accordance with one aspect of the disclosed subject matter, data types supported by the type system 100 can correspond to promises. A type constraint can be checked as far as necessary to prevent observations by a program during execution that would violate the type constraint. This meshes well with lazy construction, a language feature enabled by the type system 100 in the context of type constraints.

By way of example, suppose a program operates over a large data set or stream of data such that the entire data set cannot be held in memory at any one time. Accordingly, a type cannot be enforced in a single step, because it is not possible to hold all the data in memory and check to determine that all the data matches the type, or in other words satisfies the constraint. Furthermore, even if such an approach were possible, the process would be very inefficient. Instead, checks can be made in a step-by-step approach, as needed. More specifically, a type check can be performed upon, and just prior to, an attempt to access data.

After asserting that a value is of a type, the value is not yet known. However, the type system 100 can promise to produce a type error at runtime should it later be determined that the value is not of the type or fails to satisfy one or more constraints of the asserted type. Further, the type error can be produced before such an error is observed by an executing program. In one embodiment, value wrappers can be used to implement this feature, where redundant wrappers are folded and traces are kept for "blame assignment" in a failure case.

Figure 2A:
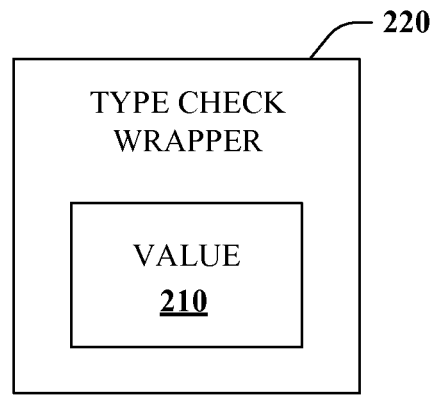
FIGS. 2A-B are block diagrams illustrating employment of type check wrappers.
Figure 2B:
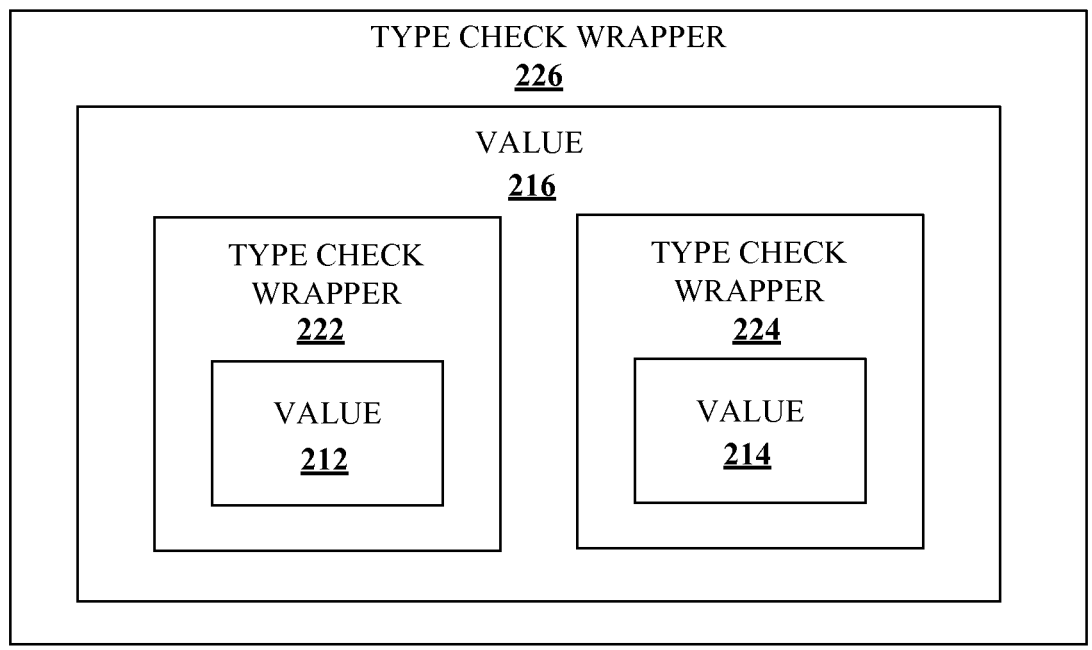

FIGS. 2A-B depict employment of type check wrappers in accordance with an aspect of this disclosure. FIG. 2A illustrates a value 210 that is wrapped by a type check wrapper 220. The value 210 can be assigned a data type, and the type check wrapper 220 can intercept calls to the value 210 and perform type checking. For example, the type check wrapper can be embodied as a function that performs a type check, and calls to the value 210 can be replaced with calls to the function. Accordingly, a type check can be performed prior to accessing the value. If the type check fails, meaning the type of the value 210 is not the type expected, a type error could be produced at runtime. Alternatively, if the type check succeeds, meaning the value is of the type expected, the type check wrapper 220 can call the value. As a result, a type check can be performed before a violation can occur.

FIG. 2B illustrates interaction of a number of values and type check wrappers. More specifically, there are several embedded values and type check wrappers, which can correspond to a two-parameter function (e.g., z=x+y). Value 212 is embedded within type check wrapper 222, and value 214 is embedded within type check wrapper 224 that together compute value 216, which is wrapped with type check wrapper 226. The layers, or redundancy, of type check wrappers enables, among other things, traces for blame assignment, or, in other words, root cause analysis. For example, if the type check performed by the type check wrapper 226 returns an unexpected type, the cause of such a type error can be traced back to the type of either or both of value 212 and value 214. In this manner, useful diagnostic information can be provided as to why a type check failed rather than simply noting the failure.

Types in the type system 100 can represent arbitrary constraints over well-defined base categories. Rather than a hierarchy of types, a set-based approach can be employed wherein there are a number of base categories and types correspond to arbitrary constraints with respect to a particular category. As shown in FIG. 3, a number of categories 310 can be utilized that segment fundamentally different things. In particular, categories can include number, text, record, and list, among others. Types 320 correspond to one or more constraints ($CONSTRAINT_1$-$CONSTRAINT_x$, where X is a positive integer) over a category. Stated differently, a value can belong to one category and types (sub-type of a category) are constraints over the category. By way of example, a type "positive numbers" can be defined based on the number category and with a constraint, or predicate, for example employing a "where" clause, that specifies that each value is greater than zero. In another example, a type "character" can be defined based on the text category that specifies text of a length of one. Accordingly, type checking can reduce to determining whether an arbitrary constraint is satisfied. Conventional type systems stay far away from this approach because compilers at compile time do not know how to reason about arbitrary constraints. Furthermore, note that the cost of "deep," or in other words complex, types is controllable since type enforcement is performed lazily.

In accordance with one aspect, the "number" category can represent the abstract uncountable set of real numbers. This feature accommodates an extensible set of number representations (e.g., binary, floating point, decimal, double . . . ). Subtypes of the "number" category can work over any of the number representations. Conventionally, limits and characteristics are defined for any kind of numeric type rather than an abstract notion of a real number. By defining the base category in this manner, subtypes that do have limitations can be accommodated as well as participate with each other.

Union types are further supported that cross categories and collapse back to categorical subsets when observed as instance types. That is, there is no value that is of "Union" type, since any actual value belongs to an underlying category. In other words, union types enable categories to be spanned such as where a value is either a number or a list, for example. This is particularly useful where flexible functions are employed that specify, for instance, a parameter can be either a single number or a list of numbers.

The type system 100 can employ a set-based approach to types to facilitate casting. Conventional hierarchical approaches require casting to be performed up a chain of type derivation. Without a notion of a hierarchy, values from the same underlying category (a.k.a. primitive type) can be cast to any category subtype, or type in the category. Among other things, a set-based approach to casting allows for flexibility in translating data between different type domains, for example when interacting with heterogeneous data sources.

Custom operator definitions can also be supported on types to introduce custom operator behavior, applicable to existing values using set-based casting. Rather than methods as used in object-oriented systems, types can have a set of operators (e.g., plus, minus, times . . . ) defined in the context of a specific type. As previously described, types can be defined using constraints over the structure of values by saying the type is a list or a record, for instance. Additionally, operators can be specified to mean something. Suppose, for example, complex numbers are defined to be records that have two fields corresponding to the two parts of a complex number. It is also desirable to perform complex arithmetic, so custom operators can be defined over a complex number. Such operators form part of a type but need not be utilized for type checking but rather to deal with values that pass a type check.

Further yet, types themselves can be first-class in a dynamic, lazy language. In accordance with one aspect, type work (e.g., assignment, analysis) is performed late (e.g., after compile time), and a runtime representation of types can be employed, which many type systems avoid. For example, traditional languages like C lose all types at compile time. In accordance with one embodiment, types are represented as values. Accordingly, a type can be created dynamically, at runtime, and used right away, similar to the way other values, such as a record or list, for instance, are constructed and utilized.

Types can also be utilized for branding values. Types can be constraints over structure. However, it may be desired to distinguish between two or more structurally equivalent values. By way of example, consider points and vectors. Both are pairs of numbers, so structurally they are the same. However, it may be desirable to capture the sematic differences. Similarly, not every record that has two text fields and a number field represents a customer. The notion of branding is, given a particular type that has constraints over structure, a label can be added to the type thereby giving the type a brand or specific identity. An "Is" operator provided by a programming language can test the manifest type, or, in other words, the super type of a value, rather than whether the value could be cast to a type. This enables use of types as brands. One way to think about a brand is as another constraint. However, a brand is not associated with a value directly but rather with a type. For instance, if there is a pair of numbers there is nothing in the pair of numbers itself that identifies whether the pair of numbers represents a point or a vector. It is just a pair of numbers. However, an "As" operator can be utilized to ascribe a brand to the type, for example to say the pair of numbers is meant to be a vector. The "As" thus provides an addition promise or constraint regarding brand that can be enforced by lazy type checking, for example.

Additionally, type variance can be employed around function application. A function specifies incoming parameters and a return value for which types can be assigned. Further, function types can be cast to other types, for example using an "As" operator. For instance, "As" over functions can properly inject "As" casts around argument and return values.

Turning attention back to FIG. 1, the analysis component 120 can be configured to employ type flow functions that can be employed to infer or compute a predicted result type of a function based on actual argument types, as opposed to declared parameter types. In the context of dynamic languages, this enables, and exceeds, some capabilities of conventional generic or dependent type systems. The implementation can be similar to function evaluation of a result value over given argument values, but instead a result type is computed over argument types. Type flow functions can also be provided to cover primitive (external) functions.

More generally, a first function can be paired up with a second function and the second function operates in the type domain. The second function, the type flow function, can infer or predict a type that would result when called with a particular set of arguments. Calling the first function would defeat the purpose of type checking since a program would have to execute before any checking could be done. Accordingly, a type flow function can be invoked with arguments to infer or predict the result type of the function at runtime.

Further, the assignment component 110 of the type system 100 can employ bi-directional type inference based on abstract interpretation over partially evaluated contexts. For example, a select-like query at a list level can take the following form:

List.Transform(
 {[ID=1, Name = "Alice"], [ID=2, Name = "Bob"]},
  each [Name])

Here, "each[Name]" is shorthand for a unary function "(item) =>item[Name]," where "item" is an item (e.g., record) in the list and where "item[Name]" selects the "Name" field of that record.

Based on the schema of the list (e.g., the first argument to "List.Transform"), it can be inferred that the untyped anonymous function passed as the second argument is a function from a record of type "type[ ID=Number.Type, Name=Text.Type]" to a value of type "Text.Type." With that inference established it can be determined that "List.Transform"'s return type is "type{Text.Type}." That is, a list of simple text values. For typeflow to work even in this simple example, inference flows both top-down and bottom-up.

Note that cases like the following require inference based on both values and types:

Table.AddColumn(Orders,
 each [Unitprice] * [Quantity], "LineTotal")

Specifically, the value "LineTotal" (a simple text value) is interpreted by "Table.AddColumn" as the name of a new column thus affecting the type of return value of "Table.AddColumn." Values can be drawn on, where available, to accomplish such inferences.

According to another aspect of the disclosure, foldable type enforcement can be employed, for instance by analysis component 120. More particularly, lazy enforcement of types enables the folding of type checks across evaluation domains. Stated differently, based on program types and types or schemas of different external execution engines or environments, a determination can be made as to whether the program or a portion thereof can be delegated to one or more of the external execution engines for execution or in other words evaluation. This interacts positively with features for federated or distributed program execution. Similarly, the assignment component 110 can utilize types or schemas associated with different execution engines or environments to identify types for values.

Although not limited thereto, the type system 100 as described herein can be employed with respect to a functional programming language associated with a data integration, or mashup, tool. The tool can draw data from multiple heterogeneous data sources (e.g., database, comma-separated values (CSV) files, OData feeds . . . ), transform, or manipulate, the data in non-trivial ways, and publish the data by several means (e.g., database, OData feed . . . ). The tool can allow non-technical users to perform complex data manipulation in a graphical environment they are familiar with, while making full expressiveness of an underlying programming language available to technical users. Moreover, the tool can encourage interactive building of complex queries or expressions in the presence of a dynamic result previews.

In accordance with one embodiment, the program language for performing data manipulation can be a dynamic, lazy formula language, wherein a formula is an expression that computes a value when executed. Such expressions can be specified indirectly by a non-technical user by way of interaction with graphical user interface elements that represent actions to be performed or directly by technical users in formula bar. Furthermore, as non-technical users become more experienced they may specify expression utilizing a hybrid approach. Regardless, the expressions can be specified without type annotations and can be executed dynamically to populate a preview of results. Consequently, dynamic typing can be employed to infer types at runtime. Furthermore, to enable optimized execution as well as execution with respect to large data sets, execution of at least a portion of an expression can be delegated to an external execution engine/environment such as, but not limited to, a query processor associated with a particular data source (e.g., relational database). In other words, federated execution can be employed across arbitrary sources/execution engines. Furthermore, execution can be performed at different times by internal and/or one or more external execution engines and as such lazy type checking can be employed on demand.

In such a situation, the type system 100 can facilitate bridging two distinct worlds. For example, types need to be understood in order to generate proper native programs for different execution engines and/or environments. On the other side, it is not desirable to burden users that specify data transformations or manipulations with contemplating and assigning types. Accordingly, type system 100 can bridge the gap by inferring and assigning types as needed at runtime (e.g., to facilitate translation) as well as performing type checking to ensure properly formed expressions. Furthermore, it should be appreciated that dynamic type assignment can provide context information to drive user assistance by way of a graphical user interface.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push or pull model. The components may also interact with one or more other components not specifically described herein for the sake of brevity, but known by those of skill in the art.

Furthermore, various portions of the disclosed systems above and methods below can include artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the assignment component 110 can include such mechanisms to determine or infer types.

Figure 4:
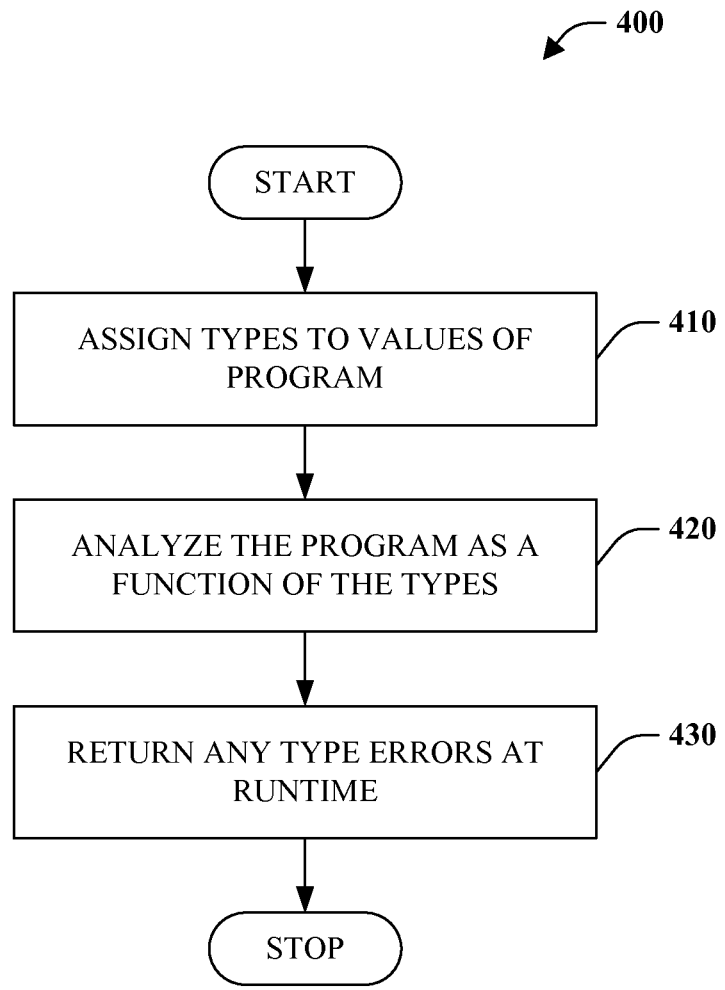
FIG. 4 is a flow chart diagram of a method of type checking.
Figure 5:
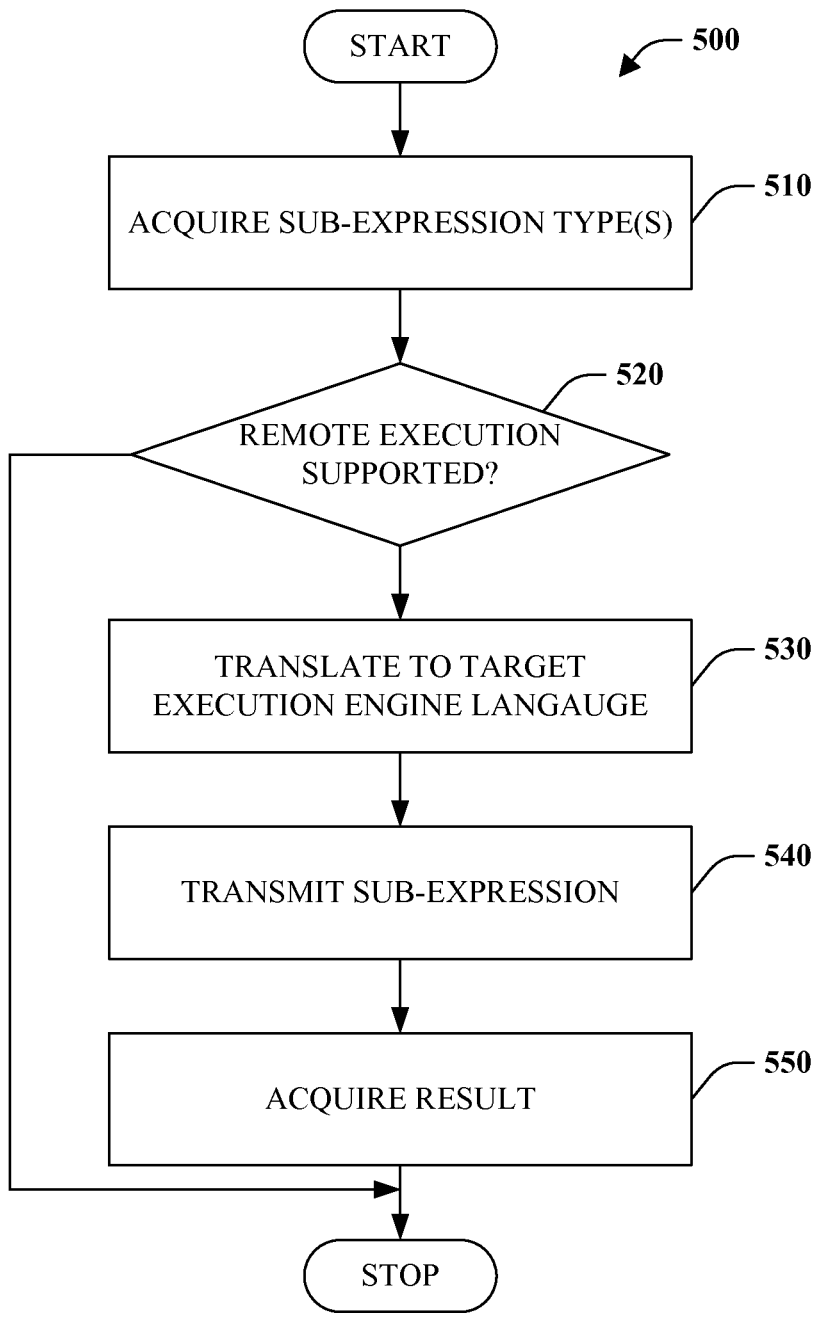
FIG. 5 is a flow chart diagram of a method of federated execution.

In view of the exemplary systems described supra, methodologies that may be implemented in accordance with the disclosed subject matter will be better appreciated with reference to the flow charts of FIGS. 4 and 5. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 4 illustrates a method of type checking 400. At reference numeral 410, types are assigned to values of program such as a program specified in a dynamic, lazy programming language. In other words, types can be determined and assigned lazily, or as needed, during program execution. By way of example, and not limitation, one or more type flow functions can be utilized to compute a predicted result type of a function based on actual argument types, as opposed to declared parameters. At reference number 420, the program is analyzed as a function of the assigned types. More specifically, type checking can be performed based on the assigned types. At reference numeral 430, type errors identified by way of analysis can be returned at runtime prior to execution of a corresponding portion of a program including the type error.

FIG. 5 is a flow chart diagram illustrating a method 500 of federating program execution. At reference numeral 510, one or more types associated with at least a sub-expression are acquired. Such types can be inferred or predicted at runtime. At numeral 520, a determination is made as to whether remote execution of the at least a sub-expression is supported by an execution environment as a function of one or more types. For example, the types involved can be compared with the types supported by a remote execution engine. If at 520, it is determined that the remote execution is not supported based on the types, the method can simply terminate, presumably to check against another remote target or proceed with local execution. Alternatively, if remote execution is supported, the at least a sub-expression is translated to a target execution engine language at 530. At reference 540, the translation is transmitted to the remote execution engine for execution. Results of execution can subsequently be received at 550.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 6:
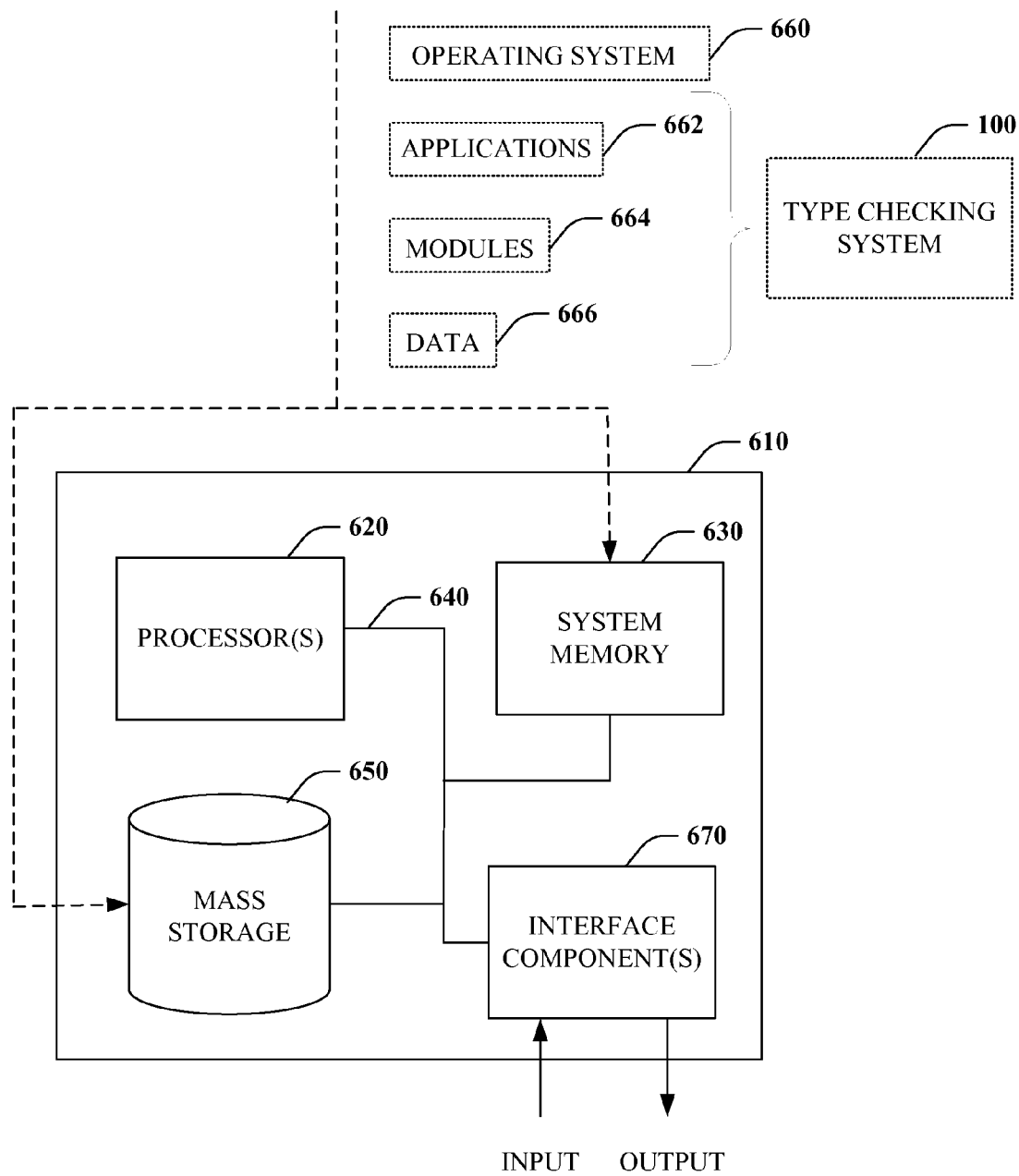
FIG. 6 is a schematic block diagram illustrating a suitable operating environment for aspects of the subject disclosure.

In order to provide a context for the claimed subject matter, FIG. 6 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 6, illustrated is an example general-purpose computer 610 or computing device (e.g., desktop, laptop, server, hand-held, programmable consumer or industrial electronics, set-top box, game system . . . ). The computer 610 includes one or more processor(s) 620, memory 630, system bus 640, mass storage 650, and one or more interface components 670. The system bus 640 communicatively couples at least the above system components. However, it is to be appreciated that in its simplest form the computer 610 can include one or more processors 620 coupled to memory 630 that execute various computer executable actions, instructions, and or components stored in memory 630.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration.

The computer 610 can include or otherwise interact with a variety of computer-readable media to facilitate control of the computer 610 to implement one or more aspects of the claimed subject matter. The computer-readable media can be any available media that can be accessed by the computer 610 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 610.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 630 and mass storage 650 are examples of computer-readable storage media. Depending on the exact configuration and type of computing device, memory 630 may be volatile (e.g., RAM), non-volatile (e.g., ROM, flash memory . . . ) or some combination of the two. By way of example, the basic input/output system (BIOS), including basic routines to transfer information between elements within the computer 610, such as during start-up, can be stored in nonvolatile memory, while volatile memory can act as external cache memory to facilitate processing by the processor(s) 620, among other things.

Mass storage 650 includes removable/non-removable, volatile/non-volatile computer storage media for storage of large amounts of data relative to the memory 630. For example, mass storage 650 includes, but is not limited to, one or more devices such as a magnetic or optical disk drive, floppy disk drive, flash memory, solid-state drive, or memory stick.

Memory 630 and mass storage 650 can include, or have stored therein, operating system 660, one or more applications 662, one or more program modules 664, and data 666. The operating system 660 acts to control and allocate resources of the computer 610. Applications 662 include one or both of system and application software and can exploit management of resources by the operating system 660 through program modules 664 and data 666 stored in memory 630 and/or mass storage 650 to perform one or more actions. Accordingly, applications 662 can turn a general-purpose computer 610 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation the type checking system 100, or portions thereof, can be, or form part, of an application 662, and include one or more modules 664 and data 666 stored in memory and/or mass storage 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the type checking system 100 and/or associated functionality can be embedded within hardware in a SOC architecture.

The computer 610 also includes one or more interface components 670 that are communicatively coupled to the system bus 640 and facilitate interaction with the computer 610. By way of example, the interface component 670 can be a port (e.g., serial, parallel, PCMCIA, USB, FireWire . . . ) or an interface card (e.g., sound, video . . . ) or the like. In one example implementation, the interface component 670 can be embodied as a user input/output interface to enable a user to enter commands and information into the computer 610 through one or more input devices (e.g., pointing device such as a mouse, trackball, stylus, touch pad, keyboard, microphone, joystick, game pad, satellite dish, scanner, camera, other computer . . . ). In another example implementation, the interface component 670 can be embodied as an output peripheral interface to supply output to displays (e.g., CRT, LCD, plasma . . . ), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method, comprising:
    employing at least one processor configured to execute computer-executable instructions stored in memory to perform the following acts;
    identifying one or more types associated with an expression of a computer-executable program at runtime just prior to evaluation of the expression, wherein evaluation of the expression is deferred until a result of the expression is required;
    determining that at least a portion of the program can be executed by a remote execution engine as a function of an identified type; and
    translating at least a portion of the program to a target programming language for remote execution.

2. The method of claim 1, further comprising evaluating one or more constraints specified by a type and returning a type error if at least one of the one or more constraints is unsatisfied.

3. The method of claim 2, further comprising evaluating the one or more constraints over a base category.

4. The method of claim 1, further comprising dynamically generating one or more types at runtime.

5. The method of claim 1, further comprising predicting a result type of a function based on one or more function argument types.

6. The method of claim 1, further comprising identifying a brand that specifies a constraint on a type.

7. A system, comprising:
    a processor coupled to a memory, the processor configured to execute the following computer-executable components stored in the memory;
    a first component configured to assign a type to an expression in a computer-executable program at runtime just prior to evaluation of the expression, wherein evaluation is deferred until a result of the expression is required; and
    a set-based type system having a plurality of base categories, wherein a type corresponds to constraints with respect to a particular base category, the base categories include number, text, record, and list, and wherein type enforcement is performed lazily.

8. The system of claim 7, further comprising a second component configured to analyze the program for errors as a function of the type during program execution.

9. The system of claim 7, wherein the type specifies a constraint over a base category.

10. The system of claim 7, wherein the type is represented as a value.

11. The system of claim 7, wherein the type includes one or more operator definitions.

12. The system of claim 7, wherein the type includes a brand that specifies a constraint on the type.

13. The system of claim 7, wherein the type is a cross-category union type.

14. The system of claim 7, wherein the type is derived from a number category that represents real numbers.

15. The system of claim 7, wherein the first component is configured to assign a function result type based on function argument types.

16. A computer-readable storage medium having instructions stored thereon that enables at least one processor to perform a method upon execution of the instructions, the method comprising:
   inferring one or more types associated with an expression of a computer program dynamically at runtime just prior to evaluation of the expression, wherein the evaluation is deferred until a result of the expression is required;
   analyzing the program for errors as a function of the one or more types; and
   acquiring one or more types from an external data source.

17. The computer-readable storage medium of claim 16, wherein an inferred type specifies a constraint over a base category.

18. The computer-readable storage medium of claim 16, wherein an inferred type is a cross-category union type.

19. The computer-readable storage medium of claim 16, wherein an inferred type is derived from a number category that represents real numbers.

20. The computer-readable storage medium of claim 16, wherein the inferring step infers a predicted result type of a function based on actual argument types, as opposed to declared parameter types.

* * * * *